United States Patent [19]

Sugita et al.

[11] Patent Number: 4,604,912
[45] Date of Patent: Aug. 12, 1986

[54] STEERING WHEEL

[75] Inventors: Hiroshi Sugita, Ichinomiya; Tetsushi Hiramitsu, Kasugai, both of Japan

[73] Assignee: Toyoda Gosei Co., Ltd., Nishikasugaigun, Japan

[21] Appl. No.: 583,266

[22] Filed: Feb. 24, 1984

[30] Foreign Application Priority Data

Feb. 25, 1983 [JP] Japan .............................. 58-27527[U]

[51] Int. Cl.$^4$ .............................................. B62D 1/04
[52] U.S. Cl. .................................. 74/484 R; 74/552; 74/492; 200/61.54
[58] Field of Search ...................... 74/498, 552, 484 R, 74/484 H, 485, 493, 492; 200/61.54, 61.55, 61.56, 61.57

[56] References Cited

U.S. PATENT DOCUMENTS

| | | | |
|---|---|---|---|
| 2,237,607 | 4/1941 | Rusche | 200/61.57 |
| 2,843,694 | 7/1958 | Bertaux | 200/61.57 |
| 3,670,120 | 6/1973 | Corn et al. | 200/61.55 |
| 4,368,454 | 1/1983 | Pilatzki | 74/484 R |
| 4,383,148 | 5/1983 | Arim et al. | 200/61.55 |
| 4,429,588 | 2/1984 | Edmundts | 74/498 |
| 4,541,301 | 9/1985 | Ono et al. | 74/484 R |
| 4,561,324 | 12/1985 | Hiramitsu et al. | 74/498 |

FOREIGN PATENT DOCUMENTS

| | | | |
|---|---|---|---|
| 49-17167 | 4/1974 | Japan . | |
| 0020532 | 2/1979 | Japan | 74/498 |
| 0037068 | 3/1982 | Japan | 74/484 R |
| 0060968 | 4/1982 | Japan | 74/498 |
| 0118455 | 7/1983 | Japan | 74/498 |

Primary Examiner—Samuel Scott
Assistant Examiner—H. A. Odar
Attorney, Agent, or Firm—Cushman, Darby & Cushman

[57] ABSTRACT

A steering wheel for a vehicle has a switch-supporting pad kept stationary at all times regardless of turning movement of the steering wheel. The steering wheel incorporates a cable for electrically connecting vehicle electric accessories such as a radio, turn signal lights, and headlights to switches mounted on the pad for controlling the electric accessories. The cable is composed of a first loosely coiled spiral positioned in a housing section in a sun gear attached to the pad, a second loosely coiled spiral positioned in a housing section in a sun gear attached to a column, and a connecting portion joining the first and second spirals and extending axially through a boss plate mounted on a steering shaft.

5 Claims, 3 Drawing Figures

STEERING WHEEL

BACKGROUND OF THE INVENTION

1. Field of the Invention

The present invention relates to a steering wheel for vehicles which has a nonrotatable or stationary pad incorporating switches for a radio, turn signal lights, headlights, a cruise control system, a push horn, or control switches such as air-conditioning system control switches, and more particularly to a cable connected to such switches and extending into the vehicle body.

2. Description of the Prior Art

Some steering wheels for vehicles such as automobiles have a stationary pad that remains nonrotatable when the steering wheel is turned or returned. The steering wheel includes a mechanism for keeping the pad immovable during operation of the steering wheel. The mechanism comprises a planetary gear mechanism including sun gears attached respectively to the column on the steering shaft and the pad, and at least a pair of planet gears supported on a planet gear shaft rotatably mounted on a boss plate and held in mesh with the respective sun gears for revolution therearound. The boss plate is fixed to the steering shaft and to a steering ring, which will be turned or returned by the driver to rotate the steering shaft. During rotation of the steering ring and shaft, the pad is maintained nonrotatable by the planetary gear mechanism.

SUMMARY OF THE INVENTION

It is an object of the present invention to provide a steering wheel for vehicles which has a cable providing reliable and durable electric connection between various electric accessories on the vehicle such as a radio, turn signal lights, headlights, a horn and switches mounted on a stationary pad on the steering wheel for controlling the electric accessories.

Another object of the present invention is to provide a steering wheel in which a mechanism for keeping a switching-supporting pad nonrotatable is of a minimum dimension in the axial direction of a steering shaft notwithstanding the arrangement of a cable connecting switches on the pad and electric accessories controlled thereby.

According to the present invention, there is provided a steering wheel assembly for a vehicle having electric accessories, comprising a stationary column, a steering shaft rotatably supported in the stationary column, a boss plate attached to the steering shaft, a steering ring supported by at least one spoke on the boss plate, a pair of first and second sun gears disposed axially one on each side of the boss plate and having a pair of first and second housing sections, respectively, the second sun gear being fixed to the stationary column, a pad attached to the first sun gear remotely from the boss plate and supporting at least one switch for controlling the electric accessories, at least one planet gear shaft rotatably supported on the boss plate, at least a pair of first and second planet gears mounted on ends of the planet gear shaft and held in mesh with the first and second sun gears, respectively, whereby the pad can be kept stationary during rotation of the steering ring and shaft, and a cable for transmitting a signal from the switch to the electric accessories, the cable comprising a first portion positioned in the first housing section, a second portion positioned in the second housing section, and a connecting portion joining the first and second portions.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
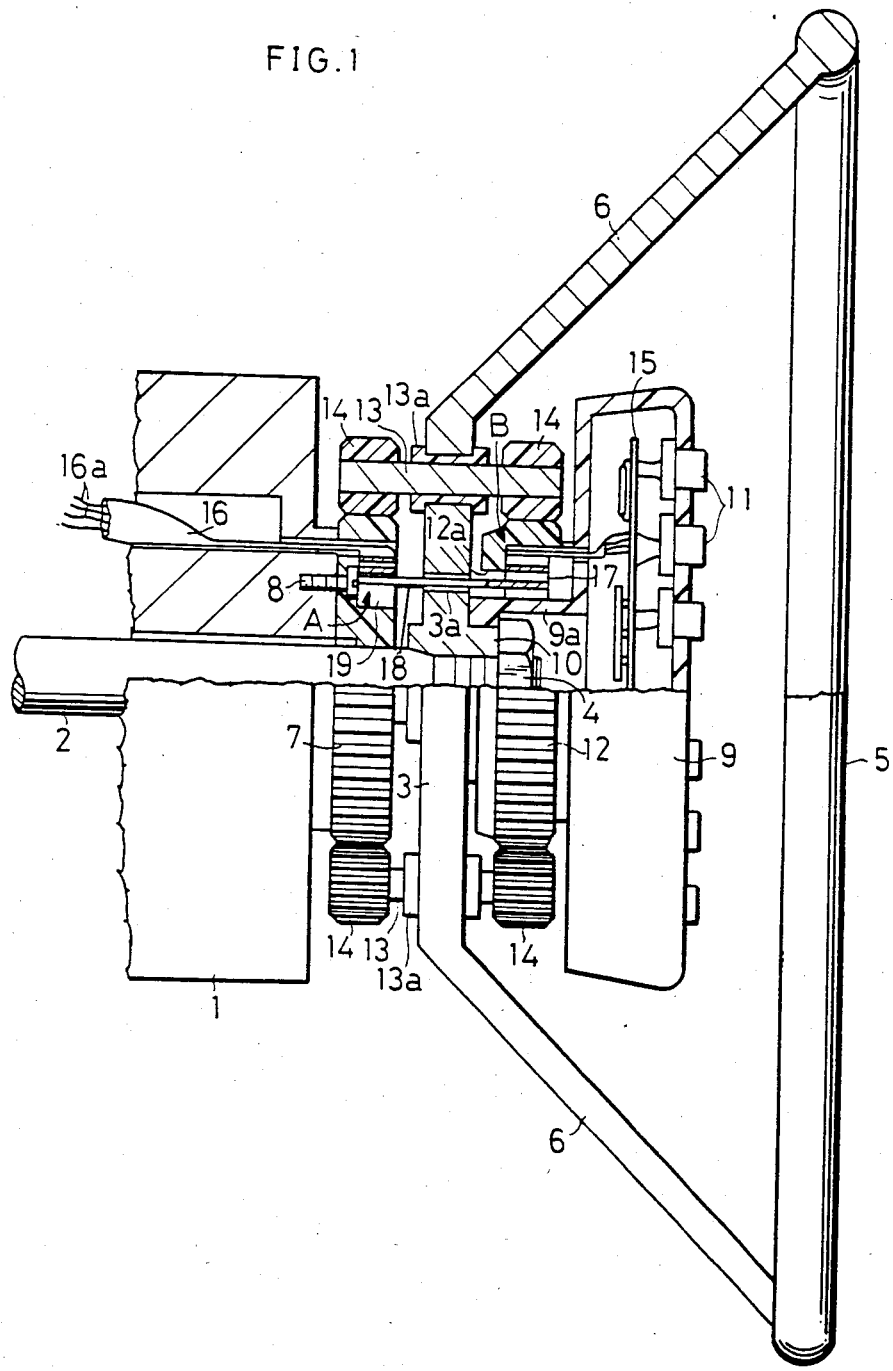
FIG. 1 is a side elevational view, partly in cross section, of a steering wheel according to the present invention.

As illustrated in FIG. 1, a hollow column 1 is mounted on an automobile body (not shown), and a steering shaft 2 extends through the hollow column 1 for rotation therein about its own axis. A boss plate 3 is fastened to the end of the steering shaft 2 by a nut 4 and has a through hole 3a defined therein at a position close to the center of the boss plate 3. A steering wheel includes a steering ring 5 manually operable by the driver and is attached through spokes 6 to the boss plate 3.

A column sun gear 7 made of synthetic resin, for example, is fixed by bolts 8 to the end face of the column 1 and has a central hole through which the steering shaft 2 extends for free rotation about its own axis. The column sun gear 7 has an annular housing slot A in a surface thereof facing the boss plate 3 and an aperture communicating with the annular housing slot A and opening at the opposite surface of the column sun gear 7.

A pad 9 has a central cylindrical member 9a projecting from a rear wall thereof toward the boss plate 3 and rotatably fitted over the outer peripheral surface of a central projection 10 of the boss plate 3. The central cylindrical member 9a is retained on the central projection 10 by the head of the nut 4 against axial displacement. The pad 9 supports thereon various switches 11 for controlling a radio, turn signal lights, headlights, a cruise control system, a push horn, and other electric accessories.

A pad sun gear 12 made of synthetic resin, for example, is fixed to the rear wall of the pad 9 and has an annular housing slot B defined in a surface thereof facing the pad 9 and an aperture 12a communicating with the annular housing slot B and opening at the opposite surface of the pad sun gear 12. The column and pad sun gears 7, 12 have the same number of teeth.

A pair of planet gear shafts 13, 13 is rotatably supported by bearings 13a on the boss plate 3. Each of the shafts 13, 13 supports on its ends planet gears 14, 14 held in mesh with the column and pad sun gears 7, 12, respectively. The planet gears 14, 14 are made of synthetic resin, for example, and have the same number of teeth.

When the boss plate 3 is turned by the steering ring 5, the planet gears 14 revolve synchronously around the sun gears 7, 12 in mesh therewith. At this time, the pad sun gear 12 and the pad 9 connected thereto remain stationary instead of turning relatively to the column 1.

The pad 15 houses a base plate 15 therein and supporting various electric parts connected to the switches 11 on the pad 15.

Figure 2:
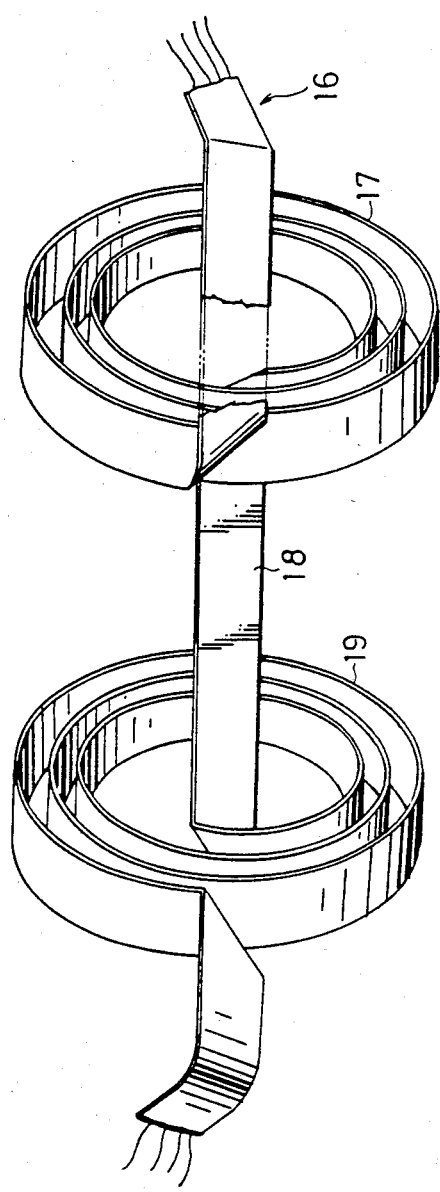
FIG. 2 is a perspective view of a cable incorporated in the steering wheel shown in FIG. 1.
Figure 3:
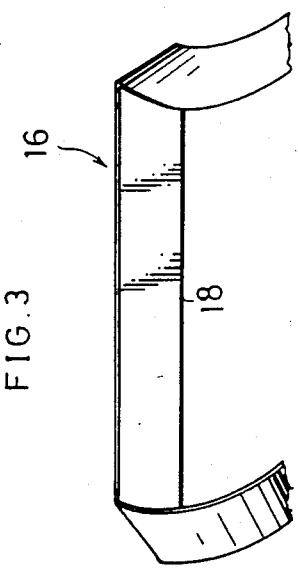
FIG. 3 is a front elevational view of a connecting portion of the cable shown in FIG. 2.

As shown in FIGS. 1, 2 and 3, a flexible cable 16 in the form of a ribbon or web has one end connected to the parts on the base plate 15, the flexible cable 16 having a plurality of electric wires 16a. The flexible cable 16 has a portion extending through the rear wall of the pad 9 and folded obliquely on itself in the annular housing slot B in the pad sun gear 12. The flexible cable 16 includes a first spiral 17 disposed in the annular housing slot B and composed of a plurality of turns coiled clockwise radially inwardly, the first spiral 17 having a radially outermost end connected to the cable portion extending from the pad 9. The flexible cable 16 also has a connecting portion 18 extending from a radially innermost end of the first spiral 17, folded obliquely on itself, running through the aperture 12a in the sun gear 12 and the hole 3a in the boss plate 3 into the annular housing slot A in the column sun gear 7, and folded obliquely on itself in the annular housing slot A. The flexible cable 16 also includes a second spiral 19 disposed in the annular housing slot A and coiled counterclockwise in the radially outward direction, the second spiral 19 having a radially innermost end connected to the connecting portion 18, and a portion extending from a radially outermost end of the second spiral 19, folded obliquely on itself, and going through the aperture in the sun gear 7 and the end of the column 1 into the column 1. The flexible cable 16 is connected to the radio, turn signal lights, headlights, cruise control system, push horn, and other electric accessories.

The first and second spirals 17, 19 have sufficient lengths and loosely coiled turns for allowing the connecting portion 18 extending through the hole 3a in the boss plate 3 to turn with the boss plate 3 without disturbing the turning movement of the boss plate 3 when the steering ring 5 is rotated.

Operation of the steering wheel thus constructed will be described. When the steering ring 5 is rotated in either direction, the boss plate 3 is turned through the spokes 6 and so is the steering shaft 2. The turning movement of the boss plate 3 causes the planet gears 14 to revolve synchronously around the column and sun gears 7, 12. During this time, the pad sun gear 12 and the pad 9 remain stationary without turning with respect to the column 1.

The connecting portion 18 of the flexible cable 16 extending through the hole 3a in the boss plate 3 is also turned by and with the boss plate 3. The connecting portion 18 is allowed by the first and second spirals 17, 19 to move freely with the boss plate 3 without any interference since the ends of the connecting portion 18 joined to the first and second spirals 17, 19 are only caused to move slightly radially as the spirals 17, 19 are progressively coiled or uncoiled, as well as being angularly moved with the boss plate 3.

With the foregoing arrangement of the steering wheel, the first and second spirals 17, 19 of the cable 6 for transmitting signals from the switches 11 on the pad 9 to the radio and other accessories are accommodated respectively in the housing slots B, A in the pad and column sun gears 12, 7. The mechanism for keeping the pad 9 stationary, composed primarily of the sun gears 12, 7, the shafts 13, and the planet gears 14, is held to a minimum dimension in the axial direction of the steering wheel. More specifically, if the spirals 17, 19 were positioned in other places than in the sun gears 12, 7, there would be required casings between the pad sun gear 12 and the boss plate 3 and between the column sun gear 7 and the boss plate 3 for accommodating the spirals 17, 19, respectively. This construction, however, would make the mechanism for keeping the pad nonrotatable project in the axial direction of the steering wheel, with the pad 9 protruding toward the driver.

With the arrangement of the invention, the space available for the steering wheel is affected to a minimum extent by the column. Because of no extra casings required for accommodating the spirals of the cable, the number of parts making up the steering wheel of the invention is not increased. Therefore, the steering wheel of the invention is advantageous from the standpoint of cost.

The present invention is in no way limited to the illustrated embodiment. Other cables may be employed than the flexible cable.

Although a certain preferred embodiment has been shown and described, it should be understood that many changes and modifications may be made therein without departing from the scope of the appended claims.

What is claimed is:

1. A steering wheel assembly for a vehicle having electrically-controlled accessories, said steering wheel assembly comprising:

a tubular stationary steering column having an end constructed and arranged to be presented towards a vehicle driver;

a steering shaft supported for rotation about its own longitudinal axis, said steering shaft extending longitudinally within said steering column and having a portion protruding out of said end of said steering column;

steering wheel boss plate means provided in said protruding portion of said steering shaft;

a steering ring secured by spoke means to said boss plate means, said steering ring being constructed and arranged to be grasped and rotated by the vehicle driver for correspondingly turning the steering shaft;

a pad disposed at least generally centrally of said steering ring, said pad mounting at least one switch means for operating an electrically-controlled accessory of the vehicle;

means journalling the pad with respect to the steering wheel boss plate means so that the steering wheel boss plate means is free to rotate angularly relative to the pad as the steering wheel is turned, but restraining axial movement of said pad longitudinally of said steering shaft, said journalling means disposing said pad so that said switch means mounted thereon is arranged to confront the vehicle driver;

first sun gear means stationarily provided on said steering column in the vicinity of said end thereof, surrounding said steering shaft;

second sun gear means fixed to said pad;

said first and second sun gear means being coaxially arranged and confronting one another with said boss plate means being sandwiched between them;

at least one planet gear shaft means, each being arranged parallel to said steering shaft but disposed eccentrically thereof on said boss plate means and journalled on said boss plate means for rotation about its own longitudinal axis;

first and second planet gear means fixed to the respective said at least one planet gear shaft means and respectively meshingly engaged with said first and second sun gear means, so that as said steering ring is rotated, said pad does not rotate but remains with its same side up confronting the vehicle driver;

means defining a first at least generally coaxially arranged annular slot in said first sun gear means;

means defining a second at least generally coaxially arranged annular slot in said second sun gear means;

means defining a slot formed axially through said boss plate means and arranged to communicate towards both said first and second annular slots;

an electrical control cable operatively connected to said at least one switch means, having a loose spiral portion in one angular sense at least generally coaxially received in said second annular slot in said second sun gear means, another loose spiral portion in an opposite angular sense at least generally coaxially received in said first annular slot in said first annular slot means, an intermediate axially extending portion extending through said slot in said base plate means and operatively interconnecting said loose spiral portions, and having a further portion extending from said opposite sense loose spiral portion for electrical connection with at least one electrically-controlled accessory, so that said steering shaft may be turned clockwise sufficiently to maximally steer the vehicle to the left and to the right without disrupting electrical control of said at least one electrically-controlled accessory.

2. A steering wheel assembly for a vehicle having electric accessories, comprising:
(a) a stationary column;
(b) a steering shaft rotatably supported in said stationary column;
(c) a boss plate attached to said steering shaft;
(d) a steering ring supported by at least one spoke on said boss plate;
(e) a pair of first and second sun gears disposed axially one on each side of said boss plate and having a pair of first and second housing sections, respectively, said second sun gear being fixed to said stationary column;
(f) a pad attached to said first sun gear remotely from said boss plate and supporting at least one switch for controlling the electric accessories;
(g) at least one planet gear shaft rotatably supported on said boss plate;
(h) at least a pair of first and second planet gears mounted on ends of said planet gear shaft and held in mesh with said first and second sun gears, respectively, whereby said pad can be kept stationary during rotation of said steering ring and shaft; and
(i) a cable for transmitting a signal from said switch to the electric accessories, said cable comprising a first spiral portion positioned in said first housing section, a second spiral portion positioned in said second housing section, and a connecting portion joining said first and second spiral portions.

3. A steering wheel assembly according to claim 2, wherein said first and second spiral portions of said cable respectively comprise first and second spirals each composed of a plurality of loosely coiled spiral turns, said connecting portion extending axially through said boss plate.

4. A steering wheel assembly according to claim 3, wherein said cable comprises a ribbon-shaped cable including a first end portion connected to said switch, folded obliquely on itself, and connected to a radially outermost end of said first spiral, said connecting portion having a first end connected to a radially innermost end of said first spiral and folded obliquely on itself and a second end connected to a radially innermost end of said second spiral and folded obliquely on itself, and a second end portion connected to a radially outermost end of said second spiral, folded obliquely on itself, and extending into said column.

5. A steering wheel assembly according to claim 3, wherein said first and second housing sections comprise annular housing slots defined in said first and second sun gears in surfaces thereof facing said pad and said boss plate, respectively.

* * * * *